US009268076B2

(12) United States Patent
Doi et al.

(10) Patent No.: US 9,268,076 B2
(45) Date of Patent: Feb. 23, 2016

(54) OPTICAL COMPENSATION LAYER, OPTICAL COMPENSATION FILM, AND PROCESSES FOR PRODUCING THESE

(75) Inventors: Toru Doi, Mie (JP); Shinsuke Toyomasu, Mie (JP); Sou Ozaki, Mie (JP); Shinji Shimosato, Aichi (JP)

(73) Assignee: TOSOH CORPORATION, Shunan-shi (JP)

( * ) Notice: Subject to any disclaimer, the term of this patent is extended or adjusted under 35 U.S.C. 154(b) by 598 days.

(21) Appl. No.: 12/596,318

(22) PCT Filed: Apr. 17, 2008

(86) PCT No.: PCT/JP2008/057544
§ 371 (c)(1),
(2), (4) Date: Oct. 16, 2009

(87) PCT Pub. No.: WO2008/130014
PCT Pub. Date: Oct. 30, 2008

(65) Prior Publication Data
US 2010/0110353 A1 May 6, 2010

(30) Foreign Application Priority Data

Apr. 18, 2007 (JP) .................................. 2007-109052
Apr. 18, 2007 (JP) .................................. 2007-109053
Dec. 25, 2007 (JP) .................................. 2007-331825

(51) Int. Cl.
G02B 5/30 (2006.01)
G02B 1/04 (2006.01)
G02F 1/13363 (2006.01)

(52) U.S. Cl.
CPC ................ *G02B 5/3083* (2013.01); *G02B 1/04* (2013.01); *B32B 2457/202* (2013.01); *G02F 1/133634* (2013.01)

(58) Field of Classification Search
None
See application file for complete search history.

(56) References Cited

U.S. PATENT DOCUMENTS

| 5,344,916 | A | 9/1994 | Harris et al. | |
|---|---|---|---|---|
| 2004/0063887 | A1 | 4/2004 | Toyomasu et al. | |
| 2004/0125451 | A1* | 7/2004 | Miyatake | 359/494 |
| 2005/0083463 | A1* | 4/2005 | Sakai et al. | 349/118 |
| 2006/0072221 | A1* | 4/2006 | Nishikouji et al. | 359/834 |
| 2007/0196592 | A1* | 8/2007 | Ono | 428/1.1 |

FOREIGN PATENT DOCUMENTS

| EP | 1 160 591 A1 | 12/2001 |
|---|---|---|
| EP | 1 403 297 A1 | 3/2004 |
| EP | 1 743 915 A1 | 1/2007 |
| JP | 8-231780 | 9/1996 |
| JP | 2565644 | 10/1996 |
| JP | 10-508048 | 8/1998 |
| JP | 11-305038 A | 11/1999 |

(Continued)

OTHER PUBLICATIONS

Office Action issued Dec. 6, 2010, in China Patent Application No. 200880012534.9 (with English-language Translation).

(Continued)

*Primary Examiner* — Gwendolyn Blackwell
*Assistant Examiner* — Anthony J Frost
(74) *Attorney, Agent, or Firm* — Oblon, McClelland, Maier & Neustadt, L.L.P.

(57) ABSTRACT

Optical compensation layers are provided which have an optically compensating function imparted thereto upon coating fluid application or upon coating fluid application and subsequent uniaxial stretching and which have a small wavelength dependence of retardation.

The invention provides: an optical compensation layer wherein the compensation layer is a coating layer comprising a maleimide resin and wherein when two arbitrary axes perpendicular to each other in the plane of the coating layer are referred to as x-axis and y-axis, respectively, and the out-of-plane direction is referred to as z-axis, then the coating layer satisfies the three-dimensional refractive-index relationship $nx \approx ny > nz$, wherein $nx$ is the refractive index in the x-axis direction, $ny$ is the refractive index in the y-axis direction, and $nz$ is the refractive index in the z-axis direction; an optical compensation film which comprises a coating layer (A) comprising a maleimide resin and a stretched-film layer (B); and an optical compensation layer, which is an optical compensation layer obtained by uniaxially stretching a coating layer comprising a maleimide resin, wherein when the direction of stretching axis in the coating layer is referred to as x-axis, the direction perpendicular to the stretching direction is referred to as y-axis, and the out-of-plane direction is referred to as z-axis, then the optical compensation layer satisfies the three-dimensional refractive-index relationship $nx4 > ny4 > nz4$, wherein $nx4$ is the refractive index in the x-axis direction, $ny4$ is the refractive index in the y-axis direction, and $nz4$ is the refractive index in the z-axis direction.

[Chem 1]

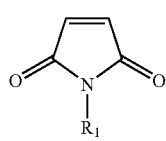

(1)

(wherein $R_1$ represents a linear alkyl group, a branched alkyl group, or a cycloalkyl group, having 1-18 carbon atoms, a halogen group, an ether group, an ester group, or an amide group).

16 Claims, No Drawings

(56) References Cited

FOREIGN PATENT DOCUMENTS

| | | | | |
|---|---|---|---|---|
| JP | 2000-80240 | | 3/2000 | |
| JP | 2000-155212 A | | 6/2000 | |
| JP | 2000-214325 | | 8/2000 | |
| JP | 2000214325 A | * | 8/2000 | ............... G02B 5/30 |
| JP | 2001-343529 A | | 12/2001 | |
| JP | 2002-293956 A | | 10/2002 | |
| JP | 2003-215343 A | | 7/2003 | |
| JP | 2004-53841 A | | 2/2004 | |
| JP | 2004-070345 A | | 3/2004 | |
| JP | 2004-269842 | | 9/2004 | |
| JP | 2005-70745 | | 3/2005 | |
| JP | 2005-321543 A | | 11/2005 | |
| JP | 2006071965 A | * | 3/2006 | |
| JP | 2006-91920 | | 4/2006 | |
| JP | 2006-113601 | | 4/2006 | |
| JP | 2006-194997 A | | 7/2006 | |
| JP | 2006-195478 | | 7/2006 | |
| JP | 2006-259621 A | | 9/2006 | |
| JP | 2006-259622 | | 9/2006 | |
| JP | 2006-259623 | | 9/2006 | |
| JP | 2006-285136 A | | 10/2006 | |
| JP | 2007-16163 | | 1/2007 | |
| JP | 2007016163 A | * | 1/2007 | |
| JP | 2007-33750 A | | 2/2007 | |
| JP | 2007-47361 | | 2/2007 | |
| WO | WO 2005/100457 A1 | | 10/2005 | |
| WO | WO 2005100457 A1 | * | 10/2005 | ................ C08J 5/18 |

OTHER PUBLICATIONS

Office Action issued Jan. 24, 2012, in Japanese Patent Application No. 2007-109053 with English translation.
Extended European Search Report issued Jun. 6, 2012, in Patent Application No. 08751871.8.
Chinese Office Action issued Jan. 18, 2012 in patent application No. 200880012534.9 with English translation.
Office Action issued Dec. 4, 2012, in Japanese Patent Application No. 2007-331825 with English translation.
Office Action issued Oct. 16, 2012 in Japanese Patent Application No. 2007-109053 with English language translation.
Office Action issued Oct. 18, 2012 in Chinese Patent Application No. 200880012534.9 with English language translation.
Office Action issued May 30, 2014 in Korean Patent Application No. 10-2009-7019365 (with English language translation).
Japanese Office Action Issued Jan. 8, 2013 in Patent Application No. 2008-075239 (with English translation).
Chinese Office Action Issued Jan. 22, 2013 in Patent Application No. 200880012534.9 (with English translation).
European Office Action Issued Feb. 15, 2013 in Patent Application No. 08 751 871.8.
European Office Action issued Dec. 12, 2013 in Patent Application No. 08 751 871.8.
Office Action issued Nov. 5, 2013 in Japanese Patent Application No. 2007-331825 (with English language translation).
Combined Taiwanese Office Action and Search Report issued Dec. 11, 2013 in Patent Application No. 097114201 (with English language translation).
Office Action issued Nov. 28, 2014 in Korean Patent Application No. 10-2009-7019365 (with English language translation).

* cited by examiner

OPTICAL COMPENSATION LAYER, OPTICAL COMPENSATION FILM, AND PROCESSES FOR PRODUCING THESE

TECHNICAL FIELD

The present invention relates to an optical compensation layer and an optical compensation film. More particularly, the invention relates to an optical compensation layer and an optical compensation film which are for use in liquid-crystal display elements and which have an optically compensating function even when that film is in an unstretched state or in a uniaxially stretched state after coating fluid application, and to processes for producing these.

BACKGROUND ART

Liquid-crystal displays are most important display devices in multimedia societies, and are in extensive use in applications ranging from cell phones to computer monitors, notebook type personal computers, and TVs. Many optical films are used in liquid-crystal displays in order to improve displaying characteristics.

In particular, optical compensation films play a major role in contrast improvement, color tone compensation, etc. in the case where the display is viewed from the front or oblique directions. The optical compensation films which have used hitherto are stretched films of polycarbonates, cyclic polyolefins, or cellulosic resins. However, these films have problems, for example, that a biaxially stretching step is necessary and that it is difficult to conduct the biaxially stretching step so as to attain evenness of retardation. Furthermore, especially in a film having a large area, it is more difficult to regulate the retardation to be imparted by biaxial stretching.

As a technique for eliminating those problems associated with the biaxial stretching, optical compensation layers are being investigated which are formed by coating fluid application (coating) and show an optically compensating function in an unstretched state.

Harris and Cheng of The University of Akron proposed optical compensation layers constituted of a rigid rod-shaped polyimide, polyester, polyamide, poly(amide-imide), or poly(ester-imide) (see, for example, patent documents 1 and 2). These materials have the property of spontaneously undergoing molecular orientation and, hence, are characterized by coming to show retardation through coating fluid application without via a stretching step.

Furthermore, an optical compensation layer formed from a polyimide having improved coating fluid applicability (solubility in solvents) (see, for example, patent document 3), a polarizer having a protective film coated with a diacotic liquid-crystal compound (see, for example, patent document 4), and the like have been proposed.

A stretched film made of a phenylmaleimide/isobutene copolymer has also been proposed (see, for example, patent document 5).

Patent Document 1: U.S. Pat. No. 5,344,916
Patent Document 2: JP-T-10-508048
Patent Document 3: JP-A-2005-070745
Patent Document 4: Japanese Patent No. 2565644
Patent Document 5: JP-A-2004-269842

DISCLOSURE OF THE INVENTION

Problems that the Invention is to Solve

However, the polymers obtained by the methods proposed in patent documents 1 to 3 have a strong wavelength dependence of retardation because they are aromatic polymers. When used as optical compensation layers for liquid-crystal display elements, these polymers pose a problem concerning a decrease in image quality, such as color shifting.

The technique proposed in patent document 4, in which a discotic liquid-crystal compound is used, has problems, for example, that it is necessary to evenly orient the liquid-crystal compound and this makes the coating process complicated and that enhanced orientation unevenness results. In addition, since this liquid-crystal compound also is mainly an aromatic compound, this technique further has a quality problem that the wavelength dependence of retardation is strong.

The stretched film obtained according to patent document 5 does not show retardation when the film is in the state of having been merely formed by coating fluid application ($nx=ny=nz$). With respect to the three-dimensional refractive indexes thereof after stretching, nz4 is the highest.

Accordingly, an object of the invention is to provide an optical compensation layer and an optical compensation film which have excellent optical properties. More particularly, the object is to provide an optical compensation layer and an optical compensation film which have an optically compensating function imparted thereto upon coating fluid application or upon coating fluid application and subsequent uniaxial stretching and which have a weak wavelength dependence of retardation.

Means for Solving the Problems

The present inventors diligently made investigations in view of those problems. As a result, they have found that a coating layer formed from a maleimide resin, a coating layer obtained by uniaxially stretching that coating layer, or an optical compensation film including a maleimide resin can be a film having an optically compensating function, especially, a coating-type optical compensation layer or optical compensation film which are suitable for optical compensation in liquid-crystal display elements. The invention has been thus completed.

That is, the invention provides: an optical compensation layer wherein the compensation layer is a coating layer comprising a maleimide resin and wherein when two arbitrary axes perpendicular to each other in the plane of the coating layer are referred to as x-axis and y-axis, respectively, and the out-of-plane direction is referred to as z-axis, then the coating layer satisfies the three-dimensional refractive-index relationship $nx \approx ny > nz$, wherein nx is the refractive index in the x-axis direction, ny is the refractive index in the y-axis direction, and nz is the refractive index in the z-axis direction; an optical compensation film which comprises a coating layer (A) comprising a maleimide resin and a stretched-film layer (B); and an optical compensation layer, which is an optical compensation layer obtained by uniaxially stretching a coating layer comprising a maleimide resin, wherein when the direction of stretching axis in the coating layer is referred to as x4-axis, the direction perpendicular to the stretching direction is referred to as y4-axis, and the out-of-plane direction is referred to as z4-axis, then the optical compensation layer satisfies the three-dimensional refractive-index relationship $nx4 > ny4 > nz4$, wherein nx4 is the refractive index in the x4-axis direction, ny4 is the refractive index in the y4-axis direction, and nz4 is the refractive index in the z4-axis direction.

Advantages of the Invention

The optical compensation layer and the optical compensation film of the invention can be produced while easily regulating their function of optical compensation. They are hence useful as optical compensation layers and optical compensation films which are effective in improving the contrast and viewing angle characteristics of liquid-crystal display elements, in particular, liquid-crystal TVs operated in the VA-mode.

BEST MODE FOR CARRYING OUT THE INVENTION

The invention will be explained below in detail.

An explanation is given on the optical compensation layer characterized in that it is a coating layer comprising a maleimide resin and that when two arbitrary axes perpendicular to each other in the plane of the coating layer are referred to as x-axis and y-axis, respectively, and the out-of-plane direction is referred to as z-axis, then the coating layer satisfies the three-dimensional refractive-index relationship $nx \approx ny > nz$, wherein nx is the refractive index in the x-axis direction, ny is the refractive index in the y-axis direction, and nz is the refractive index in the z-axis direction.

Examples of the maleimide resin include N-substituted maleimide polymer resins and N-substituted maleimide-maleic anhydride copolymer resins. Examples of the N-substituted-maleimide residue unit constituting the maleimide resin include a residue unit of N-substituted maleimides represented by the following formula (1).

[Chem 1]

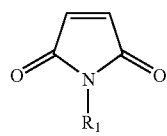

(1)

(wherein $R_1$ represents a linear alkyl group, a branched alkyl group, or a cycloalkyl group, having 1-18 carbon atoms, a halogen group, an ether group, an ester group, or an amide group).

Specific examples of the N-substituted-maleimide residue unit include one or more kinds selected from an N-methylmaleimide residue unit, N-ethylmaleimide residue unit, N-chloroethylmaleimide residue unit, N-methoxyethylmaleimide residue unit, N-n-propylmaleimide residue unit, N-isopropylmaleimide residue unit, N-n-butylmaleimide residue unit, N-isobutylmaleimide residue unit, N-s-butylmaleimide residue unit, N-t-butylmaleimide residue unit, N-hexylmaleimide residue unit, N-cyclohexylmaleimide residue unit, N-octylmaleimide residue unit, N-laurylmaleimide residue unit, and the like. Especially preferred are an N-n-butylmaleimide residue unit, N-isobutylmaleimide residue unit, N-s-butylmaleimide residue unit, N-t-butylmaleimide residue unit, N-hexylmaleimide residue unit, and N-octylmaleimide residue unit. Therefore these units give a maleimide resin which is apt to show retardation and is excellent in solubility in solvents and mechanical strength.

Examples of the N-substituted maleimide polymer resin include N-methylmaleimide polymer resins, N-ethylmaleimide polymer resins, N-chloroethylmaleimide polymer resins, N-methoxyethylmaleimide polymer resins, N-n-propylmaleimide polymer resins, N-isopropylmaleimide polymer resins, N-n-butylmaleimide polymer resins, N-isobutylmaleimide polymer resins, N-s-butylmaleimide polymer resins, N-t-butylmaleimide polymer resins, N-hexylmaleimide polymer resins, N-cyclohexylmaleimide polymer resins, N-octylmaleimide polymer resins, and N-laurylmaleimide polymer resins.

Examples of the N-substituted maleimide-maleic anhydride copolymer resin include N-methylmaleimide-maleic anhydride copolymer resins, N-ethylmaleimide-maleic anhydride copolymer resins, N-chloroethylmaleimide-maleic anhydride copolymer resins, N-methoxyethylmaleimide-maleic anhydride copolymer resins, N-n-propylmaleimide-maleic anhydride copolymer resins, N-isopropylmaleimide-maleic anhydride copolymer resins, N-n-butylmaleimide-maleic anhydride copolymer resins, N-isobutylmaleimide-maleic anhydride copolymer resins, N-s-butylmaleimide-maleic anhydride copolymer resins, N-t-butylmaleimide-maleic anhydride copolymer resins, N-hexylmaleimide-maleic anhydride copolymer resins, N-cyclohexylmaleimide-maleic anhydride copolymer resins, N-octylmaleimide-maleic anhydride copolymer resins, and N-laurylmaleimide-maleic anhydride copolymer resins.

Especially preferred of those are N-n-butylmaleimide polymer resins, N-hexylmaleimide polymer resins, N-octylmaleimide polymer resins, and N-octylmaleimide-maleic anhydride copolymer resins. Therefore these resins have excellent film-forming properties in layer formation and give an optical compensation layer excellent in optically compensating function and heat resistance.

The maleimide resin constituting this optical compensation layer of the invention may comprise a residue unit other than N-substituted-maleimide residue unit and maleic anhydride residue unit so long as this does not depart from the object of the invention. Examples of such optional residue units include one or more kinds of the following: styrene compound residue units such as a styrene residue unit and an α-methylstyrene residue unit; an acrylic acid residue unit; acrylic ester residue units such as a methyl acrylate residue unit, ethyl acrylate residue unit, and butyl acrylate residue unit; a methacrylic acid residue unit; methacrylic ester residue units such as a methyl methacrylate residue unit, ethyl methacrylate residue unit, and butyl methacrylate residue unit; vinyl ester residues such as a vinyl acetate residue, vinyl propionate residue, vinyl pivalate residue, vinyl laurate residue, and vinyl stearate residue; an acrylonitrile residue; a methacrylonitrile residue; and the like.

It is preferred that the maleimide resin should be one which has a number-average molecular weight (Mn), calculated for standard polystyrene from an elution curve obtained in gel permeation chromatography (hereinafter referred to as GPC), of $1 \times 10^3$ or higher. The number-average molecular weight thereof is especially preferably from $2 \times 10^4$ to $2 \times 10^5$ because this maleimide resin gives an optical compensation layer having excellent mechanical properties and excellent formability in layer formation.

For producing the maleimide resin constituting this optical compensation layer of the invention, any process may be employed so long as the maleimide resin is obtained. For example, the resin can be produced by subjecting at least one N-substituted maleimide and maleic anhydride to radical polymerization or radical copolymerization optionally together with one or more monomers copolymerizable with the N-substituted maleimide. Examples of the N-substituted maleimide include one or more of N-methylmaleimide, N-ethylmaleimide, N-chloroethylmaleimide, N-methoxyethylmaleimide, N-n-propylmaleimide, N-isopropylmaleimide, N-n-butylmaleimide, N-isobutylmaleimide, N-s-butylmaleimide, N-t-butylmaleimide, N-hexylmaleimide, N-cyclohexylmaleimide, N-octylmaleimide, and the like. Examples of the copolymerizable monomers include one or more of: styrene compounds such as styrene and α-methylstyrene; acrylic acid; acrylic acid esters such as methyl acrylate, ethyl acrylate, and butyl acrylate; methacrylic acid; methacrylic acid esters such as methyl methacrylate, ethylmethacrylate, and butylmethacrylate; vinyl esters such as vinyl acetate, vinyl propionate, vinyl pivalate, vinyl laurate, and vinyl stearate; acrylonitrile; methacrylonitrile; and the like.

The radical polymerization can be conducted using a known polymerization technique. For example, all of polymerization techniques such as bulk polymerization, solution polymerization, suspension polymerization, precipitation polymerization, and emulsion polymerization can be employed.

Examples of polymerization initiators usable in the case of conducting radical polymerization include organic peroxides such as benzoyl peroxide, lauryl peroxide, octanoyl peroxide, acetyl peroxide, di-t-butyl peroxide, t-butyl, cumyl peroxide, dicumyl peroxide, t-butylperoxyacetate, and t-butyl peroxybenzoate; and azo initiators such as 2,2'-azobis(2,4-dimethylvaleronitrile), 2,2'-azobis(2-butyronitrile), 2,2'-azobisisobutyronitrile, dimethyl 2,2'-azobisisobutyrate, and 1,1'-azobis(cyclohexane-1-carbonitrile).

Solvents usable in solution polymerization, suspension polymerization, precipitation polymerization, and emulsion polymerization are not particularly limited. Examples thereof include aromatic solvents such as benzene, toluene, and xylene; alcohol solvents such as methanol, ethanol, propyl alcohol, and butyl alcohol; cyclohexane; dioxane; tetrahydrofuran (THF); acetone; methyl ethyl ketone; dimethylformamide; isopropyl acetate; water; and N-methylpyrrolidone. Examples thereof further include mixed solvents composed of two or more of these.

A polymerization temperature in the case of conducting radical polymerization can be suitably set according to the decomposition temperature of the polymerization initiator. In general, it is preferred to conduct the polymerization at a temperature in the range of 40-150° C.

This optical compensation layer of the invention is a coating layer comprising the maleimide resin, and is excellent especially in the function of optical compensation when used as an optical compensation layer. In the case where a film made of a polymer is to be used as an optical compensation film, the three-dimensional refractive indexes of the film are generally regulated by, e.g., the biaxial stretching of the film. However, the step of biaxial stretching has problems, for example, that the production steps and quality control become complicated. In contrast, the optical compensation layer of the invention is a coating layer comprising a maleimide resin and is an optical compensation layer characterized in that when two arbitrary axes perpendicular to each other in the plane of the coating layer are referred to as x-axis and y-axis, respectively, and the out-of-plane direction is referred to as z-axis, then the coating layer satisfies the three-dimensional refractive-index relationship $nx \approx ny > nz$, wherein nx is the refractive index in the x-axis direction, ny is the refractive index in the y-axis direction (when nx is not equal to ny, the lowest refractive index is taken as nx), and nz is the refractive index in the z-axis direction. It has been found that this layer exhibits such a peculiar behavior that the layer in an unstretched state has a lower refractive index in the thickness direction of the layer.

The thickness-direction retardation (Rth) of this optical compensation layer of the invention can be easily regulated by changing the thickness of the coating layer comprising the maleimide resin. The out-of-plane retardation (Rth) thereof, as determined with a light having a measuring wavelength of 589 nm and represented by the following expression (2), is preferably in the range of 30-2,000 nm because this optical compensation layer can be expected to be suitable for use as a retardation film. In particular, the retardation (Rth) thereof is in the range of preferably 50-1,000 nm, more preferably 80-500 nm, because this optical compensation layer has the excellent effect of improving the viewing angle characteristics of liquid-crystal display elements.

$$Rth = ((nx+ny)/2 - nz) \times d \quad (2)$$

(In expression (2), d represents the thickness (nm) of the optical compensation layer.)

It is preferred that this optical compensation layer of the invention should be one which has a weak wavelength dependence of retardation, because use of this optical compensation layer in a liquid-crystal display element enables the liquid-crystal display element to be reduced in color shifting. In particular, the wavelength dependence of retardation (R450/R589) thereof, which is represented by the ratio of the retardation (R450) of the coating layer inclined at 40 degrees and examined with a light having a measuring wavelength of 450 nm to the retardation (R589) of the coating layer inclined at 40 degrees and examined with a light having a measuring wavelength of 589 nm, is preferably 1.1 or lower, especially 1.08 or lower.

It is preferred that this optical compensation layer of the invention has a light transmittance, as measured in accordance with JIS K 7361-1 (1997), of 85% or higher, especially 90% or higher, because this optical compensation layer imparts satisfactory image quality when used in a liquid-crystal display element. It is also preferred that the haze of the optical compensation layer, as measured in accordance with JIS K 7136 (2000), is 2% or lower, especially 1% or lower.

This optical compensation layer of the invention preferably has high heat resistance from the standpoint of quality stability in liquid-crystal display elements. The glass transition temperature thereof is preferably 100° C. or higher, especially preferably 120° C. or higher, even more preferably 135° C. or higher.

This optical compensation layer of the invention is characterized by being a coating layer comprising a maleimide resin. Examples of preferred processes for producing the layer include a process in which a maleimide resin in a solution state is applied to a glass base or a film substrate made of triacetyl cellulose, polyethylene terephthalate) (PET), or the like. For the application, use may be made of a method in which a solution prepared by dissolving the maleimide resin in a solvent is applied to a glass base or film and the solvent is thereafter removed by heating, etc. As a technique for the application, use is made, for example, of the doctor blade method, bar coater method, gravure coater method, slot die coater method, lip coater method, comma coater method, or the like. Industrially, the gravure coater method and the comma coater method are generally employed for thin coating and thick coating, respectively. The solvent to be used is not particularly limited. Examples thereof include aromatic solvents such as toluene, xylene, chlorobenzene, and nitrobenzene; ketone solvents such as acetone, methyl ethyl ketone, methyl isobutyl ketone, and cyclohexanone; ether solvents such as dimethyl ether, diethyl ether, methyl-t-butyl ether, tetrahydrofuran, and dioxane; acetic ester solvents such as methyl acetate, ethyl acetate, n-propyl acetate, isopropyl acetate, and butyl acetate; hydrocarbon solvents such as hexane, cyclohexane, octane, and decane; alcohol solvents such as methanol, ethanol, propanol, and butanol; chlorine compound solvents such as carbon tetrachloride, chloroform, methylene chloride, dichloroethane, and trichloroethane;

amide solvents such as dimethylformamide and dimethylacetamide; and N-methylpyrrolidone. A combination of two or more of these solvents can be used. In the solution application, it is preferred to regulate the viscosity of the solution to 10-10,000 cps, especially to 10-5,000 cps, because an optical compensation layer having high transparency, excellent in thickness accuracy and surface smoothness is more easily obtained from such solution.

The thickness in which the maleimide resin is to be applied in this operation is determined by the thickness-direction retardation of the coating layer. In particular, the thickness thereof on a dry basis is in the range of preferably 1-100 μm, more preferably 3-50 μm, especially preferably 5-30 μm, from the standpoint of obtaining excellent surface smoothness and the excellent effect of improving viewing angle characteristics.

This optical compensation layer of the invention may be used after having been peeled from the substrate, i.e., a glass base or another optical film, or may be used in the form of a layered product including the substrate, i.e., a glass base or another optical film. In particular, in the case where the optical compensation layer is formed on another optical film and this layered product is used as an optical compensation film, the other optical film preferably is a film made of a cellulosic resin, and especially preferably is a film made of triacetyl cellulose, because this optical film is excellent in transparency, strength, and adhesiveness.

This optical compensation layer of the invention may be used also as a layered product including a polarizer. An antioxidant may have been incorporated in the optical compensation layer of the invention in order to enhance thermal stability. Examples of the antioxidant include hindered phenol antioxidants, phosphorus compound antioxidants, and other antioxidants. These antioxidants may be used alone or in combination. It is preferred to use a hindered phenol antioxidant in combination with a phosphorus compound antioxidant because these antioxidants synergistically attain an improved oxidation-preventing function. In this case, it is especially preferred to mix 100-500 parts by weight of the phosphorus compound antioxidant with 100 parts by weight of the hindered phenol antioxidant. With respect to the amount of the antioxidant(s) to be added, the amount thereof is in the range of preferably 0.01-10 parts by weight, especially preferably 0.5-1 parts by weight, per 100 parts by weight of the maleimide resin constituting the optical compensation layer of the invention.

Furthermore, an ultraviolet absorber such as, for example, benzotriazole, benzophenone, triazine, or a benzoate may be incorporated according to need.

This optical compensation layer of the invention may be one in which another polymer and other ingredients, e.g., a surfactant, polymer electrolyte, conductive complex, inorganic filler, pigment, dye, antioxidant, anti-blocking agent, and lubricant, have been incorporated without departing from the spirit of the invention.

The optical compensation film comprising a coating layer (A) comprising a maleimide resin and a stretched-film layer (B) is explained next.

The coating layer (A) as a component of this optical compensation film is a coating layer comprising a maleimide resin. Examples of the maleimide resin include N-substituted maleimide polymer resins and N-substituted maleimide-maleic anhydride copolymer resins. Examples of the N-substituted-maleimide residue units constituting the maleimide resin include a residue unit of N-substituted maleimide represented by formula (1) given above.

Specific examples of the N-substituted-maleimide residue units include one or more kinds selected from an N-methylmaleimide residue unit, N-ethylmaleimide residue unit, N-chloroethylmaleimide residue unit, N-methoxyethylmaleimide residue unit, N-n-propylmaleimide residue unit, N-isopropylmaleimide residue unit, N-n-butylmaleimide residue unit, N-isobutylmaleimide residue unit, N-s-butylmaleimide residue unit, N-t-butylmaleimide residue unit, N-hexylmaleimide residue unit, N-cyclohexylmaleimide residue unit, N-octylmaleimide residue unit, N-laurylmaleimide residue unit, and the like. Especially preferred are an N-n-butylmaleimide residue unit, N-isobutylmaleimide residue unit, N-s-butylmaleimide residue unit, N-t-butylmaleimide residue unit, N-hexylmaleimide residue unit, and N-octylmaleimide residue unit. Therefore these units give a maleimide resin which is apt to show retardation and is excellent in solubility in solvents and mechanical strength.

Examples of the N-substituted maleimide polymer resins include N-methylmaleimide polymer resins, N-ethylmaleimide polymer resins, N-chloroethylmaleimide polymer resins, N-methoxyethylmaleimide polymer resins, N-n-propylmaleimide polymer resins, N-isopropylmaleimide polymer resins, N-n-butylmaleimide polymer resins, N-isobutylmaleimide polymer resins, N-s-butylmaleimide polymer resins, N-t-butylmaleimide polymer resins, N-hexylmaleimide polymer resins, N-cyclohexylmaleimidepolymer resins, N-octylmaleimide polymer resins, and N-laurylmaleimide polymer resins.

Examples of the N-substituted maleimide-maleic anhydride copolymer resins include N-methylmaleimide-maleic anhydride copolymer resins, N-ethylmaleimide-maleic anhydride copolymer resins, N-chloroethylmaleimide-maleic anhydride copolymer resins, N-methoxyethylmaleimide-maleic anhydride copolymer resins, N-n-propylmaleimide-maleic anhydride copolymer resins, N-isopropylmaleimide-maleic anhydride copolymer resins, N-n-butylmaleimide-maleic anhydride copolymer resins, N-isobutylmaleimide-maleic anhydride copolymer resins, N-s-butylmaleimide-maleic anhydride copolymer resins, N-t-butylmaleimide-maleic anhydride copolymer resins, N-hexylmaleimide-maleic anhydride copolymer resins, N-cyclohexylmaleimide-maleic anhydride copolymer resins, N-octylmaleimide-maleic anhydride copolymer resins, and N-laurylmaleimide-maleic anhydride copolymer resins.

Especially preferred of those are N-n-butylmaleimide polymer resins, N-hexylmaleimide polymer resins, N-octylmaleimide polymer resins, and N-octylmaleimide-maleic anhydride copolymer resins. Therefore these resins have excellent layer-forming properties in layer formation and give an optical compensation film excellent in optically compensating function and heat resistance.

The maleimide resin constituting the coating layer (A) may comprise a residue unit other than N-substituted-maleimide residue unit and a maleic anhydride residue unit so long as this does not depart from the object of the invention. Examples of such optional residue units include one or more kinds of the following; styrene compound residue units such as a styrene residue unit and an α-methylstyrene residue unit; an acrylic acid residue unit; acrylic acid ester residue units such as a methyl acrylate residue unit, ethyl acrylate residue unit, and butyl acrylate residue unit; a methacrylic acid residue unit; methacrylic ester residue units such as a methyl methacrylate residue unit, ethyl methacrylate residue unit, and butyl methacrylate residue unit; vinyl ester residues such as a vinyl acetate residue, vinyl propionate residue, vinyl pivalate residue, vinyl laurate residue, and vinyl stearate residue; an acrylonitrile residue; a methacrylonitrile residue; and the like.

It is preferred that the maleimide resin is one which has a number-average molecular weight (Mn), calculated for standard polystyrene from an elution curve obtained in gel permeation chromatography (hereinafter referred to as GPC), of $1 \times 10^3$ or higher. The number-average molecular weight thereof is especially preferably from $2 \times 10^4$ to $2 \times 10^5$ because this maleimide resin gives a coating layer (A) having excellent mechanical properties and excellent formability in layer formation.

For producing the maleimide resin constituting the coating layer (A), any process may be employed so long as the maleimide resin is obtained. For example, the resin can be produced by subjecting at least one N-substituted maleimide and maleic anhydride to radical polymerization or radical copolymerization optionally together with one or more monomers copolymerizable with the N-substituted maleimide. Examples of the N-substituted maleimide include one or more of N-methylmaleimide, N-ethylmaleimide, N-chloroethylmaleimide, N-methoxyethylmaleimide, N-n-propylmaleimide, N-isopropylmaleimide, N-n-butylmaleimide, N-isobutylmaleimide, N-s-butylmaleimide, N-t-butylmaleimide, N-hexylmaleimide, N-cyclohexylmaleimide, N-octylmaleimide, N-laurylmaleimide, and the like. Examples of the copolymerizable monomers include one or more of: styrene compounds such as styrene and α-methylstyrene; acrylic acid; acrylic acid esters such as methyl acrylate, ethyl acrylate, and butyl acrylate; methacrylic acid; methacrylic acid esters such as methyl methacrylate, ethyl methacrylate, and butyl methacrylate; vinyl esters such as vinyl acetate, vinyl propionate, vinyl pivalate, vinyl laurate, and vinyl stearate; acrylonitrile; methacrylonitrile; and the like.

The radical polymerization can be conducted using a known polymerization technique. For example, all of polymerization techniques such as bulk polymerization, solution polymerization, suspension polymerization, precipitation polymerization, and emulsion polymerization can be employed.

Examples of polymerization initiators usable in the case of conducting radical polymerization include organic peroxides such as benzoyl peroxide, lauryl peroxide, octanoyl peroxide, acetyl peroxide, di-t-butyl peroxide, t-butyl cumyl peroxide, dicumyl peroxide, t-butyl peroxyacetate, and t-butyl peroxybenzoate; and azo initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile).

Solvents usable in solution polymerization, suspension polymerization, precipitation polymerization, and emulsion polymerization are not particularly limited. Examples thereof include aromatic solvents such as benzene, toluene, and xylene; alcohol solvents such as methanol, ethanol, propyl alcohol, and butyl alcohol; cyclohexane; dioxane; tetrahydrofuran (THF); acetone; methyl ethyl ketone; dimethylformamide; isopropyl acetate; water; and N-methylpyrrolidone. Examples thereof further include mixed solvents composed of two or more of these.

A polymerization temperature in the case of conducting radical polymerization can be suitably set according to the decomposition temperature of the polymerization initiator. In general, it is preferred to conduct the polymerization at a temperature in the range of 40-150° C.

The coating layer (A) constituting the optical compensation film of the invention is a coating layer comprising the maleimide resin, and is excellent especially in the function of optical compensation. In the case where a film made of a polymer is to be used as an optical compensation film, the three-dimensional refractive indexes of the film are generally regulated by, e.g., the biaxial stretching of the film. However, the step of biaxial stretching has problems, for example, that the production steps and quality control become complicated. The present inventors have found that, in contrast to the case described above, the coating layer comprising the maleimide resin exhibits such a peculiar behavior that the coating layer in an unstretched state has a lower refractive index in the film thickness direction.

It is preferred that this optical compensation film of the invention is one in which the coating layer (A) is a coating layer wherein when two arbitrary axes perpendicular to each other in the plane of the coating layer are referred to as x1-axis and y1-axis, respectively, and the out-of-plane direction (thickness direction) is referred to as z1-axis, then the coating layer satisfies the three-dimensional refractive-index relationship nx1≈ny1>nz1, wherein nx1 is the refractive index in the x1-axis direction, ny1 is the refractive index in the y1-axis direction (when nx1 is not equal to ny1, the lowest refractive index is taken as nx1), and nz1 is the refractive index in the z1-axis direction. Therefore this optical compensation film is excellent especially in the function of optical compensation.

The thickness-direction retardation (Rth1) of the coating layer (A) can be easily regulated by changing the thickness of the coating layer comprising the maleimide resin. The out-of-plane retardation (Rth1) thereof, as determined with a light having a measuring wavelength of 589 nm and represented by the following expression (3), is preferably in the range of 30-2,000 nm because this coating layer (A) enables the optical compensation film to be expected to be suitable for use as a retardation film. In particular, the retardation (Rth1) thereof is in the range of preferably 50-1,000 nm, more preferably in the range of 80-500 nm, because this coating layer (A) has the excellent effect of improving the viewing angle characteristics of liquid-crystal display elements.

$$Rth1 = ((nx1+ny1)/2 - nz1) \times d1 \qquad (3)$$

(In expression (3), d1 represents the thickness (nm) of the coating layer (A).)

It is preferred that the coating layer (A) is one which has a small wavelength dependence of retardation, because use of the optical compensation film including this coating layer (A) in a liquid-crystal display element enables the liquid-crystal display element to be reduced in color shifting. In particular, the wavelength dependence of retardation (R450/R589) thereof, which is represented by the ratio of the retardation (R450) of the coating layer inclined at 40 degrees and examined with a light having a measuring wavelength of 450 nm to the retardation (R589) of the coating layer inclined at 40 degrees and examined with a light having a measuring wavelength of 589 nm, is preferably 1.1 or lower, especially 1.08 or lower.

It is preferred that the coating layer (A) has a light transmittance, as measured in accordance with JIS K 7361-1 (1997), of 85% or higher, especially 90% or higher, because the optical compensation film obtained imparts satisfactory image quality when used in a liquid-crystal display element. It is also preferred that the haze of the coating layer (A), as measured in accordance with JIS K 7136 (2000), is 2% or lower, especially 1% or lower.

The coating layer (A) preferably has high heat resistance from the standpoint of the quality stability required when the optical compensation film obtained is used in a liquid-crystal display element. The glass transition temperature thereof is preferably 100° C. or higher, especially preferably 120° C. or higher, even more preferably 135° C. or higher.

The stretched-film layer (B) as a component of this optical compensation film of the invention comprises a stretched transparent film. Examples thereof include films made of polycarbonate resins, polyethersulfone resins, cyclic polyolefin resins, and cellulosic resins. Preferred of these are uniaxially stretched films made of polycarbonates, uniaxially stretched films made of polyethersulfones, uniaxially stretched films made of cyclic polyolefins, and uniaxially stretched films made of cellulosic resins, these films each having positive birefringence. It is especially preferred that the layer (B) is a stretched-film layer made of a cyclic polyolefin resin because this layer enables the optical compensation film to have a small wavelength dependence of retardation. The term positive birefringence herein means the following property: when the direction of stretching in the plane of the stretched film is referred to as x2-axis, the in-plane direction perpendicular to the direction of stretching is referred to as y2-axis, and the out-of-plane (thickness) direction for the film is referred to as z2-axis, then the film satisfies the three-dimensional refractive-index relationship nx2>ny2≥nz2, wherein nx2 is the refractive index in the x2-axis direction, ny2 is the refractive index in the y2-axis direction, and nz2 is the refractive index in the z2-axis direction.

The stretched-film layer (B) preferably is one in which the in-plane retardation (Re) thereof represented by following expression (4), as determined with a light having a measuring wavelength of 589 nm, is in the range of 20-1,000 nm because the optical compensation film obtained can be expected to be suitable for use as a retardation film. In particular, the retardation (Re) thereof is in the range of preferably 50-500 nm, more preferably 80-300 nm, because the optical compensation film employing this layer (B) has the excellent effect of improving the viewing angle characteristics of liquid-crystal display elements. In this connection, the stretched-film layer (B) can be constituted of two or more stretched films. For example, in the case where two films are used respectively on both sides of a liquid-crystal cell, the in-plane retardation (Re) per film may be half of the retardation shown above.

$$Re=(nx2-ny2)\times d2 \quad (4)$$

(In expression (4), d2 represents the thickness (nm) of the stretched-film layer (B).)

The stretched film constituting the stretched-film layer (B) can be produced by stretching, with a known stretcher, a film produced by the solution casting method or melt extrusion method. A commercial product of the stretched film is also available.

This optical compensation film of the invention comprises the coating layer (A) and the stretched-film layer (B) and is suitable for use as an optical compensation film for liquid-crystal display elements. In particular, it is preferred that the optical compensation film has a light transmittance, as measured in accordance with JIS K 7361-1 (1997), of 85% or higher, especially 90% or higher, because this optical compensation film imparts satisfactory image quality when used in a liquid-crystal display element. It is also preferred that the haze of the optical compensation film, as measured in accordance with JIS K 7136 (2000), is 2% or lower, especially 1% or lower.

Furthermore, this optical compensation film of the invention preferably is one in which when the direction of the in-plane slow axis for the optical compensation film is referred to as x3-axis, the in-plane direction perpendicular to the x3-axis is referred to as y3-axis, and the out-of-plane (thickness) direction for the film is referred to as z3-axis and when the film is examined with a light having a measuring wavelength of 589 nm, then the film has an orientation parameter (Nz) of preferably 1.1 or larger, especially 1.3 or larger, more preferably 2.0 or larger, wherein the orientation parameter is represented by the following expression (5), wherein nx3 is the average refractive index in the x3-axis direction, ny3 is the average refractive index in the y3-axis direction, and nz3 is the average refractive index in the z3-axis direction. The term slow axis means the axial direction in which the refractive index is the highest.

$$Nz=(nx3-nz3)/(nx3-ny3) \quad (5)$$

The in-plane retardation (Re2) thereof represented by the following expression (8) is preferably 20-1,000 nm, especially preferably 50-500 nm.

$$Re2=(nx3-ny3)\times d5 \quad (8)$$

(In expression (8), d5 represents the thickness (nm) of the film.)

Examples of preferred processes for producing this optical compensation film of the invention, which comprises the coating layer (A) comprising a maleimide resin and the stretched-film layer (B), include: 1) a process in which a coating layer produced by applying a maleimide resin solution to a glass base or film substrate is laminated to a stretched film; 2) a process in which a coating layer comprising a maleimide resin is disposed on one side of a liquid-crystal cell and a stretched film is disposed on the other side; and 3) a process in which a maleimide resin solution is applied to a stretched film and dried to produce a coating layer. Preferred of these is the process in which a maleimide resin solution is applied to a stretched film and dried to produce a coating layer and thereby obtain the optical compensation film. Therefore the optical compensation film of the invention can be produced more easily by this process.

Examples of methods for producing the coating layer (A) include a method in which a solution prepared by dissolving a maleimide resin in a solvent is applied to a glass base, film substrate, or stretched film and the solvent is thereafter removed by heating, etc. As a technique for the application, use is made, for example, of the doctor blade method, bar coater method, gravure coater method, slot die coater method, lip coater method, comma coater method, or the like. Industrially, the gravure coater method and the comma coater method are generally employed for thin coating and thick coating, respectively. The solvent to be used is not particularly limited. Examples thereof include aromatic solvents such as toluene, xylene, chlorobenzene, and nitrobenzene; ketone solvents such as acetone, methyl ethyl ketone, methyl isobutyl ketone, and cyclohexanone; ether solvents such as dimethyl ether, diethyl ether, methyl-t-butyl ether, tetrahydrofuran, and dioxane; acetic ester solvents such as methyl acetate, ethyl acetate, n-propyl acetate, isopropyl acetate, and butyl acetate; hydrocarbon solvents such as hexane, cyclohexane, octane, and decane; alcohol solvents such as methanol, ethanol, propanol, and butanol; chlorine compound solvents such as carbon tetrachloride, chloroform, methylene chloride, dichloroethane, and trichloroethane; amide solvents such as dimethylformamide and dimethylacetamide; and N-methylpyrrolidone. A combination of two or more of these solvents can be used. In the solution application, it is preferred to regulate the solution viscosity of the maleimide resin solution to 10-10,000 cps, especially to 10-5,000 cps, because the application of such solution can attain high transparency, excellent thickness accuracy, and excellent surface smoothness and enables an optical compensation film of excellent quality to be produced.

The thickness in which the maleimide resin is to be applied is determined by the thickness-direction retardation of the coating layer (A). In particular, the thickness thereof after dry is in the range of preferably 1-100 μm, more preferably 3-50 μm, especially preferably 5-30 μm, from the standpoint of obtaining an optical compensation film having excellent surface smoothness and having the excellent effect of improving viewing angle characteristics.

This optical compensation film of the invention may be used also as a layered product including a polarizer.

An antioxidant may have been incorporated in this optical compensation film of the invention in order to enhance thermal stability. Examples of the antioxidant include hindered phenol antioxidants, phosphorus compound antioxidants, and other antioxidants. These antioxidants may be used alone or in combination. It is preferred to use a hindered phenol antioxidant in combination with a phosphorus compound antioxidant because these antioxidants synergistically attain an improved oxidation-preventing function. In this case, it is especially preferred to mix 100-500 parts by weight of the phosphorus compound antioxidant with 100 parts by weight of the hindered phenol antioxidant. With respect to the amount of the antioxidant(s) to be added, the amount thereof is in the range of preferably 0.01-10 parts by weight, especially preferably 0.5-1 parts by weight, per 100 parts by weight of the maleimide resin constituting this optical compensation film of the invention.

Furthermore, an ultraviolet absorber such as, for example, benzotriazole, benzophenone, triazine, or a benzoate may be incorporated according to need.

This optical compensation film of the invention may be one in which another polymer and other ingredients, e.g., a surfactant, polymer electrolyte, conductive complex, inorganic filler, pigment, dye, antioxidant, anti-blocking agent, and lubricant, have been incorporated without departing from the spirit of the invention.

An explanation is given below on the optical compensation layer characterized in that it is an optical compensation layer obtained by uniaxially stretching a coating layer comprising a maleimide resin and that when the direction of stretching for the coating layer is referred to as x4-axis, the direction perpendicular to the stretching direction is referred to as y4-axis, and the out-of-plane direction is referred to as z4-axis, then the optical compensation layer satisfies the three-dimensional refractive-index relationship nx4>ny4≥nz4, wherein nx4 is the refractive index in the x4-axis direction, ny4 is the refractive index in the y4-axis direction, and nz4 is the refractive index in the z4-axis direction.

This optical compensation film of the invention is an optical compensation film characterized by having been obtained by uniaxially stretching a coating layer comprising a maleimide resin. Examples of the maleimide resin include N-substituted maleimide polymer resins and N-substituted maleimide-maleic anhydride copolymer resins.

Examples of the N-substituted-maleimide residue units constituting the N-substituted maleimide polymer resins include a residue unit of N-substituted maleimide represented by formula (1) given above.

$R_1$ in the residue unit of the N-substituted maleimide represented by formula (1) is a linear alkyl group, a branched alkyl group, and a cycloalkyl group, having 1-18 carbon atoms, a halogen group, an ether group, an ester group, or an amide group. Examples of the linear alkyl group having 1-18 carbon atoms include methyl group, ethyl group, n-propyl group, n-butyl group, n-hexyl group, n-octyl group, and n-lauryl group. Examples of the branched alkyl group having 1-18 carbon atoms include isopropyl group, isobutyl group, s-butyl group, and t-butyl group. Examples of the cycloalkyl group having 1-18 carbon atoms include cyclohexyl group. Examples of the halogen group include chlorine, bromine, and iodine.

Specific examples of the residue unit of N-substituted maleimide represented by formula (1) include one or more kinds selected from an N-methylmaleimide residue unit, N-ethylmaleimide residue unit, N-chloroethylmaleimide residue unit, N-methoxyethylmaleimide residue unit, N-n-propylmaleimide residue unit, N-n-butylmaleimide residue unit, N-n-hexylmaleimide residue unit, N-n-octylmaleimide residue unit, N-n-laurylmaleimide residue unit, N-isopropylmaleimide residue unit, N-isobutylmaleimide residue unit, N-s-butylmaleimide residue unit, N-t-butylmaleimide residue unit, and N-cyclohexylmaleimide residue unit. Especially preferred are an N-ethylmaleimide residue unit, N-n-butylmaleimide residue unit, N-isobutylmaleimide residue unit, N-s-butylmaleimide residue unit, N-t-butylmaleimide residue unit, N-n-hexylmaleimide residue unit, and N-n-octylmaleimide residue unit. Therefore these units give an optical compensation layer which is apt to show retardation and is excellent in solubility in solvents and mechanical strength.

Specific examples of the N-substituted maleimide polymer resin include one or more of N-methylmaleimide polymer resins, N-ethylmaleimide polymer resins, N-chloroethylmaleimide polymer resins, N-methoxyethylmaleimide polymer resins, N-n-propylmaleimide polymer resins, N-n-butylmaleimide polymer resins, N-n-hexylmaleimide polymer resins, N-n-octylmaleimide polymer resins, N-n-laurylmaleimide polymer resins, N-isopropylmaleimide polymer resins, N-isobutylmaleimide polymer resins, N-s-butylmaleimide polymer resins, N-t-butylmaleimide polymer resins, and N-cyclohexylmaleimide polymer resins. Especially preferred are N-ethylmaleimide polymer resins, N-n-butylmaleimide polymer resins, N-isobutylmaleimide polymer resins, N-s-butylmaleimide polymer resins, N-t-butylmaleimide polymer resins, N-n-hexylmaleimide polymer resins, N-n-octylmaleimide polymer resins, and the like. Therefore these resins give an optical compensation layer which is apt to show retardation and is excellent in solubility in solvents and mechanical strength.

Moreover, examples of the N-substituted maleimide-maleic anhydride copolymer resins include N-methylmaleimide-maleic anhydride copolymer resins, N-ethylmaleimide-maleic anhydride copolymer resins, N-chloroethylmaleimide-maleic anhydride copolymer resins, N-methoxyethylmaleimide-maleic anhydride copolymer resins, N-n-propylmaleimide-maleic anhydride copolymer resins, N-n-butylmaleimide-maleic anhydride copolymer resins, N-n-hexylmaleimide-maleic anhydride copolymer resins, N-n-octylmaleimide-maleic anhydride copolymer resins, N-n-laurylmaleimide-maleic anhydride copolymer resins, N-isopropylmaleimide-maleic anhydride copolymer resins, N-isobutylmaleimide-maleic anhydride copolymer resins, N-s-butylmaleimide-maleic anhydride copolymer resins, N-t-butylmaleimide-maleic anhydride copolymer resins, and N-cyclohexylmaleimide-maleic anhydride copolymer resins.

Especially preferably, the maleimide resin is an N-n-ethylmaleimide polymer resin, N-n-butylmaleimide polymer resin, N-n-hexylmaleimide polymer resin, N-n-octylmaleimide polymer resin, or N-n-octylmaleimide-maleic anhydride copolymer resin among those resins. Therefore these resins have excellent layer-forming properties in layer formation and give an optical compensation film excellent in optically compensating function and heat resistance.

The maleimide resin constituting this optical compensation layer of the invention may comprise a residue unit other than N-substituted-maleimide residue unit and maleic anhydride residue unit so long as this does not depart from the object of the invention. Examples of such optional residue unit include one or more kinds of the following: styrene compound residue units such as a styrene residue unit and an α-methylstyrene residue unit; an acrylic acid residue unit; acrylic acid ester residue units such as a methyl acrylate residue unit, ethyl acrylate residue unit, and butyl acrylate residue unit; a methacrylic acid residue unit; methacrylic acid ester residue units such as a methyl methacrylate residue unit, ethyl methacrylate residue unit, and butyl methacrylate residue unit; vinyl ester residues such as a vinyl acetate residue, vinyl propionate residue, vinyl pivalate residue, vinyl laurate residue, and vinyl stearate residue; an acrylonitrile residue; a methacrylonitrile residue; and the like.

It is preferred that the maleimide resin is one which has a number-average molecular weight (Mn), calculated for standard polystyrene from an elution curve obtained in gel permeation chromatography (hereinafter referred to as GPC), of $1 \times 10^3$ or higher. The number-average molecular weight thereof is especially preferably from $2 \times 10^4$ to $2 \times 10^5$ because this maleimide resin gives an optical compensation layer having excellent mechanical properties and excellent formability in layer formation.

For producing the maleimide resin constituting this optical compensation layer of the invention, any process may be employed so long as the maleimide resin is obtained. For example, the resin can be produced by subjecting at least one N-substituted maleimide and maleic anhydride to radical polymerization or radical copolymerization optionally together with one or more monomers copolymerizable with the N-substituted maleimide. Examples of the N-substituted maleimide include one or more of N-methylmaleimide, N-ethylmaleimide, N-chloroethylmaleimide, N-methoxyethylmaleimide, N-n-propylmaleimide, N-n-butylmaleimide, N-n-hexylmaleimide, N-n-octylmaleimide, N-n-laurylmaleimide, N-isopropylmaleimide, N-isobutylmaleimide, N-s-butylmaleimide, N-t-butylmaleimide, N-cyclohexylmaleimide, and the like. Examples of the copolymerizable monomers include one or more of: styrene compounds such as styrene and α-methylstyrene; acrylic acid; acrylic acid esters such as methyl acrylate, ethyl acrylate, and butyl acrylate; methacrylic acid; methacrylic acid esters such as methyl methacrylate, ethyl methacrylate, and butyl methacrylate; vinyl esters such as vinyl acetate, vinyl propionate, vinyl pivalate, vinyl laurate, and vinyl stearate; acrylonitrile; methacrylonitrile; and the like.

The radical polymerization can be conducted using a known polymerization technique. For example, all of polymerization techniques such as bulk polymerization, solution polymerization, suspension polymerization, precipitation polymerization, and emulsion polymerization can be employed.

Examples of polymerization initiators usable in the case of conducting radical polymerization include organic peroxides such as benzoyl peroxide, lauryl peroxide, octanoyl peroxide, acetyl peroxide, di-t-butyl peroxide, t-butyl cumyl peroxide, dicumyl peroxide, t-butylperoxyacetate, and t-butyl peroxybenzoate; and azo initiators such as 2,2'-azobis(2,4-dimethylvaleronitrile), 2,2'-azobis(2-butyronitrile), 2,2'-azobisisobutyronitrile, dimethyl 2,2'-azobisisobutyrate, and 1,1'-azobis(cyclohexane-1-carbonitrile).

Solvents usable in solution polymerization, suspension polymerization, precipitation polymerization, and emulsion polymerization are not particularly limited. Examples thereof include aromatic solvents such as benzene, toluene, and xylene; alcohol solvents such as methanol, ethanol, propyl alcohol, and butyl alcohol; cyclohexane; dioxane; tetrahydrofuran (THF); acetone; methyl ethyl ketone; dimethylformamide; isopropyl acetate; water; N-methylpyrrolidone; and dimethylformamide. Examples thereof further include mixed solvents composed of two or more of these.

A polymerization temperature in the case of conducting radical polymerization can be suitably set according to the decomposition temperature of the polymerization initiator. In general, it is preferred to conduct the polymerization at a temperature in the range of 40-150° C.

This optical compensation layer of the invention is a film obtained by uniaxially stretching a coating layer comprising the maleimide resin. This optical compensation layer is excellent especially in the function of optical compensation when used as an optical compensation layer. In general, it is extremely difficult in biaxial stretching to regulate three-dimensional refractive indexes. As the screen area of displays increases and the area of the optical compensation layers increases accordingly, it becomes difficult to evenly regulate the whole area, resulting in a decrease in yield, etc. In the invention, by uniaxially stretching a specific coating layer, an optical compensation layer having the excellent function of optical compensation can be obtained. This optical compensation layer of the invention is characterized in that it is an optical compensation layer obtained by uniaxially stretching a coating layer comprising a maleimide resin and that when the direction of stretching axes for the coating layer is referred to as x4-axis, the direction perpendicular to the stretching direction is referred to as y4-axis, and the out-of-plane direction is referred to as z4-axis, then the optical compensation layer satisfies the three-dimensional refractive-index relationship nx4>ny4>nz4, wherein nx4 is the refractive index in the x4-axis direction, ny4 is the refractive index in the y4-axis direction, and nz4 is the refractive index in the z4-axis direction.

The in-plane retardation (Re1) of this optical compensation layer of the invention can be easily regulated by changing the thickness of the coating layer made of the maleimide resin and changing conditions for the uniaxial stretching. The in-plane retardation (Re1) thereof, as determined with a light having a measuring wavelength of 589 nm and represented by the following expression (6), is preferably 20 nm or more, especially from 30 nm to 200 nm, more preferably from 40 nm to 150 nm, because this optical compensation layer can be expected to be suitable for use as a retardation film.

$$Re1 = (nx4 - ny4) \times d3 \qquad (6)$$

(In expression (6), d3 represents the thickness (nm) of the optical compensation layer.)

Furthermore, the out-of-plane retardation (Rth2) of this optical compensation layer of the invention can be easily regulated by changing the thickness of the coating layer made of the maleimide resin and changing conditions for the uniaxial stretching. The out-of-plane retardation (Rth2) thereof, as determined with a light having a measuring wavelength of 589 nm and represented by the following expression (7), is preferably in the range of 30-2,000 nm because this optical compensation layer cart be expected to be suitable for use as a retardation film. In particular, the retardation (Rth2) thereof is in the range of preferably 50-1,000 nm, more preferably 80-400 nm, because this optical compensation layer has the excellent effect of improving the viewing angle characteristics of liquid-crystal display elements.

$$Rth2=((nx44-ny4)/2-nz4) \times d4 \quad (7)$$

(In expression (7), d4 represents the thickness (nm) of the optical compensation layer.)

It is preferred that this optical compensation layer of the invention is one which has a small wavelength dependence of retardation, because use of this optical compensation layer in a liquid-crystal display element enables the liquid-crystal display element to be reduced in color shifting. The wavelength dependence of retardation (R450/R589) thereof, which is represented by the ratio of the retardation determined at a measuring wavelength of 450 nm (R450) to the retardation determined at a measuring wavelength of 589 nm (R589), is preferably 1.1 or lower, especially 1.08 or lower.

The thickness of this optical compensation layer of the invention is preferably 1-100 μm, more preferably 3-50 μm, especially preferably 5-30 μm, because the optical compensation layer having such a thickness has excellent surface smoothness and the excellent effect of improving viewing angle characteristics.

It is preferred that this optical compensation layer of the invention has a light transmittance of 85% or higher, especially 90% or higher, because this optical compensation layer imparts satisfactory image quality when used in a liquid-crystal display element. It is also preferred that the haze of this optical compensation layer is 2% or lower, especially 1% or lower.

This optical compensation layer of the invention preferably has high heat resistance from the standpoint of quality stability in liquid-crystal display elements. The glass transition temperature thereof is preferably 100° C. or higher, especially preferably 120° C. or higher, even more preferably 135° C. or higher.

This optical compensation layer of the invention is characterized by being obtained by uniaxially stretching a coating layer comprising a maleimide resin. Examples of preferred processes for producing the layer include a process in which a maleimide resin in a solution state is applied to a film substrate made of, e.g., a cellulosic resin or a poly(ethylene terephthalate) resin (PET) and dried and the resultant coated substrate is uniaxially stretched. For the application, use may be made of a method in which a solution prepared by dissolving the maleimide resin in a solvent is applied to a film and the solvent is thereafter removed by heating, etc., then the resultant coated layer is uniaxially stretched. As a technique for the application, use is made, for example, of the doctor blade method, bar coater method, gravure coater method, slot die coater method, lip coater method, comma coater method, or the like. Industrially, the gravure coater method and the comma coater method are generally employed for thin coating and thick coating, respectively.

The solvent to be used is not particularly limited. Examples thereof include aromatic solvents such as toluene, xylene, chlorobenzene, and nitrobenzene; ketone solvents such as acetone, methyl ethyl ketone, methyl isobutyl ketone, and cyclohexanone; ether solvents such as dimethyl ether, diethyl ether, methyl-t-butyl ether, tetrahydrofuran, and dioxane; acetic acid ester solvents such as methyl acetate, ethyl acetate, n-propyl acetate, isopropyl acetate, and butyl acetate; hydrocarbon solvents such as hexane, cyclohexane, octane, and decane; alcohol solvents such as methanol, ethanol, propanol, and butanol; chlorine compound solvents such as carbon tetrachloride, chloroform, methylene chloride, dichloroethane, and trichloroethane; amide solvents such as dimethylformamide and dimethylacetamide; and N-methylpyrrolidone. A combination of two or more of these solvents can be used. In the solution application, the viscosity of the coating solution is an extremely important factor in forming a coating having high transparency and excellent in thickness accuracy and surface smoothness. The viscosity of the coating solution is preferably 10-10,000 cps, especially preferably 10-5,000 cps.

The thickness in which the maleimide resin is to be applied in this operation is determined by the thickness-direction retardation of the coating layer. In particular, the thickness thereof after dry is in the range of preferably 1-100 μm, more preferably 3-50 μm, especially preferably 5-30 μm, from the standpoint of obtaining an optical compensation layer having excellent surface smoothness and the excellent effect of improving viewing angle characteristics.

The uniaxial stretching for obtaining this optical compensation film of the invention is not particularly limited. In general, the coating layer can be stretched in a stretch ratio in the range of 1.1-5 under the conditions of a stretching temperature higher by from −30 to 50° C. than the glass transition temperature of the coating layer as measured with a differential scanning calorimeter. It is preferred to minimize thickness unevenness because optical properties such as, in particular, retardation, light transmittance, and haze are considerably influenced by thickness. In the coating layer stretching in the invention, the stretching temperature can be lowered by regulating drying conditions in the coating layer production to allow part of the solvent to remain. The coating layer can be stretched after having been peeled from the substrate film, or can be stretched together with the substrate film.

Examples of methods for uniaxial stretching which can be employed in the invention include methods such as a method in which the coating layer is stretched with a tenter, a method in which the coating layer is stretched by rolling with a calendar, and a method in which the coating layer is stretched between rolls.

This optical compensation layer of the invention may be used after having been peeled from the substrate film, or may be used in the form of a layered product including the substrate film or another optical film. In particular, in the case where the optical compensation layer is used as a layered product including another optical film, the other optical film preferably is a cellulosic film or a film of a cyclic polyolefin from the standpoints of transparency and strength.

This optical compensation layer of the invention may be used also as a layered product including a polarizer.

An antioxidant may have been incorporated in this optical compensation layer of the invention in order to enhance thermal stability. Examples of the antioxidant include hindered phenol antioxidants, phosphorus compound antioxidants, and other antioxidants. These antioxidants may be used alone or in combination. It is preferred to use a hindered phenol antioxidant in combination with a phosphorus compound antioxidant because these antioxidants synergistically attain an improved oxidation-preventing function. In this case, it is especially preferred to mix 100-500 parts by weight of the phosphorus compound antioxidant with 100 parts by weight of the hindered phenol antioxidant. With respect to the amount of the antioxidant(s) to be added, the amount thereof is in the range of preferably 0.01-10 parts by weight, especially preferably 0.5-1 parts by weight, per 100 parts by weight of the maleimide resin constituting the optical compensation layer of the invention.

Furthermore, an ultraviolet absorber such as, for example, benzotriazole, benzophenone, triazine, or a benzoate may be incorporated according to need.

This optical compensation layer of the invention may be one in which another polymer and other ingredients, e.g., a surfactant, polymer electrolyte, conductive complex, inorganic filler, pigment, dye, antioxidant, anti-blocking agent, and lubricant, have been incorporated without departing from the spirit of the invention.

EXAMPLES

The invention will be explained below in more detail by reference to Examples. However, the invention should not be construed as being limited by the following Examples in any way.

Determination of Number-Average Molecular Weight:

A gel permeation chromatograph (GPC) (trade name, HLC-802A; manufactured by Tosoh Corp.) was used, and dimethylformamide was used as a solvent. Number-average molecular weight was determined as a value calculated for standard polystyrene.

Measurement of Glass Transition Temperature:

A differential scanning calorimeter (trade name, DSC2000; manufactured by Seiko Instruments & Electronics Ltd.) was used to make a measurement at a heating rate of 10° C./min.

Determination of Light Transmittance:

Light transmittance was determined as a measure of transparency according to JIS K 7361-1 (1997).

Determination of Haze:

Haze was determined as a measure of transparency according to JIS K 7136 (2000).

Calculation of Three-Dimensional Refractive Indexes:

A sample inclination type automatic birefringence meter (trade name, KOBRA-WR; manufactured by Oji Scientific Instruments) was used to measure the three-dimensional refractive indexes for a light having a measuring wavelength of 589 nm while changing the angle of elevation. Furthermore, the out-of-plane retardation (Rth, Rth1, or Rth2) was calculated from the three-dimensional refractive indexes.

The wavelength dependence of retardation (R450/R589) was shown in terms of the ratio of the retardation determined at a measuring wavelength of 450 nm (R450) to the retardation determined at a measuring wavelength of 589 nm (R589).

Synthesis Example 1

Production Example of N-n-Butylmaleimide Polymer Resin

Into a sealed glass tube were introduced 32.4 g of N-n-butylmaleimide and 0.054 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-butylmaleimide polymer resin was obtained in an amount of 20 g. The N-n-butylmaleimide polymer resin obtained had a number-average molecular weight of 120,000.

Synthesis Example 2

Production Example of N-n-Hexylmaleimide Polymer Resin

Into a sealed glass tube were introduced 40 g of N-n-hexylmaleimide and 0.05 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-hexylmaleimide polymer resin was obtained in an amount of 32 g. The N-n-hexylmaleimide polymer resin obtained had a number-average molecular weight of 160,000.

Synthesis Example 3

Production Example of N-n-Octylmaleimide Polymer Resin

Into a sealed glass tube were introduced 28 g of N-n-octylmaleimide and 0.032 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-octylmaleimide polymer resin was obtained in an amount of 15 g. The N-n-octylmaleimide polymer resin obtained had a number-average molecular weight of 270,000.

Synthesis Example 4

Production Example 1 of N-n-Octylmaleimide-Maleic Anhydride Copolymer Resin Into a sealed glass tube were introduced 26 g of N-n-octylmaleimide, 2.4 g of maleic anhydride, and 0.036 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-octylmaleimide-maleic anhydride copolymer resin was obtained in an amount of 19 g. The N-n-octylmaleimide-maleic anhydride copolymer resin obtained contained a maleic anhydride residue in an amount of 20% by weight and had a number-average molecular weight of 120,000.

Synthesis Example 5

Production Example 2 of N-n-Octylmaleimide-Maleic Anhydride Copolymer Resin Into a sealed glass tube were introduced 26 g of N-n-octylmaleimide, 4.8 g of maleic anhydride, and 0.04 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-octylmaleimide-maleic anhydride copolymer resin was obtained in an amount of 18 g. The N-n-octylmaleimide-maleic anhydride copolymer resin obtained contained maleic anhydride residue unit in an amount of 40% by weight and had a number-average molecular weight of 140,000.

Synthesis Example 6

Production Example 3 of
N-n-Octylmaleimide-Maleic Anhydride Copolymer
Resin

Into a sealed glass tube were introduced 26 g of N-n-octylmaleimide, 4.8 g of maleic anhydride, and 0.04 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-octylmaleimide-maleic anhydride copolymer resin was obtained in an amount of 18 g. The N-n-octylmaleimide-maleic anhydride copolymer resin obtained contained maleic anhydride residue unit in an amount of 20% by weight and had a number-average molecular weight of 140,000.

Synthesis Example 7

Production Example of N-n-Ethylmaleimide
Polymer Resin

Into a sealed glass tube were introduced 45 g of N-n-ethylmaleimide and 0.05 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-ethylmaleimide polymer resin was obtained in an amount of 20 g. The N-n-ethylmaleimide polymer resin obtained had a number-average molecular weight of 80,000.

Synthesis Example 8

Production Example 4 of
N-n-Octylmaleimide-Maleic Anhydride Copolymer
Resin

Into a sealed glass tube were introduced 26 g of N-n-octylmaleimide, 2.4 g of maleic anhydride, and 0.036 g of dimethyl-2,2'-azobisisobutyrate as a polymerization initiator. After nitrogen displacement, a radical polymerization reaction was conducted under the conditions of a polymerization temperature of 60° C. and a polymerization time of 5 hours. Chloroform was added after the reaction to obtain a polymer solution. Thereafter, this solution was mixed with excess methanol to thereby precipitate the polymer. The polymer obtained was taken out by filtration, subsequently sufficiently washed with methanol, and dried at 80° C. Thus, an N-n-octylmaleimide-maleic anhydride copolymer resin was obtained in an amount of 19 g. The N-n-octylmaleimide-maleic anhydride copolymer resin obtained contained a maleic anhydride residue in an amount of 20% by weight and had a number-average molecular weight of 140,000.

Production Example 1

Production Example for Uniaxially Stretched Film of
Cyclic Polyolefin Resin

A cyclic polyolefin resin (hydrogenated polynorbornene having ester group; manufactured by Aldrich Co.) was dissolved in methylene chloride solution to obtain a 25% solution. Thereto were added 0.35 parts by weight of tris(2,4-di-t-butylphenyl) phosphite and 0.15 parts by weight of pentaerythritol-tetrakis(3-(3,5-di-t-butyl-4-hydroxyphenyl) propionate) as antioxidants and 1 part by weight of 2-(2H-benzotriazol-2-yl)-p-cresol as an ultraviolet absorber per 100 parts by weight of the cyclic polyolefin resin. Thereafter, the resultant mixture was cast on the support of a solution casting apparatus by the T-die method and dried at 40° C., 80° C., and 120° C. to obtain a film having a width of 250 mm and a thickness of 100 μm. The film obtained was cut into a square shape having a side length of 50 mm. The cut film was subjected to free-width uniaxial stretching with a biaxially stretching apparatus (manufactured by Imoto Machinery Co., Ltd.) under the conditions of a temperature of 180° C. and a stretching speed of 15 mm/min. The film was thus stretched by +100%.

The resultant stretched film showed positive birefringence, and the three-dimensional refractive indexes thereof were $nx2=1.5124$, $ny2=1.5090$, and $nz2=1.5090$. Namely, $nx2>ny2=nz2$. The stretched film had an in-plane retardation (Re) of 121 nm. The wavelength dependence of in-plane retardation (R450/R550) thereof was 1.01.

Example 1

The N-n-butylmaleimide polymer resin obtained in Synthesis Example 1 was dissolved in chloroform to prepare a 12% solution. This solution was cast on a glass base by a coater and dried at room temperature for 24 hours to obtain a coating layer on the glass base. Thus, a coating layer film having a width of 50 mm and a thickness of 20 μm was produced. The glass transition temperature (Tg) of the coating layer film was measured and, as a result, was found to be 179° C.

The coating layer obtained had a light transmittance of 91.6% and a haze of 0.6%, and the three-dimensional refractive indexes thereof were $nx1=1.51607$, $ny=1.51607$, and $nz=1.50954$. The layer had an in-plane retardation of 0 nm and an Rth of 130.6 nm. The value of R450/R589 thereof, which indicates the wavelength dependence of retardation, was 1.06, showing that the coating layer had the function of an optical compensation layer.

Example 2

The N-n-hexylmaleimide polymer resin obtained in Synthesis Example 2 was dissolved in chloroform to prepare a 15% solution. This solution was cast on a glass base by a coater and dried at room temperature for 24 hours to obtain a coating layer on the glass base. Thus, a coating layer film having a width of 50 mm and a thickness of 30 μm was produced. The Tg of the coating layer film was measured and, as a result, was found to be 149° C.

The coating layer obtained had a light transmittance of 91.8% and 4 haze of 0.7%, and the three-dimensional refractive indexes thereof were nx=1.52000, ny=1.52002, and nz=1.51638. The layer had an in-plane retardation of 0.6 nm and an Rth of 108.9 nm. The value of R450/R589 thereof, which indicates the wavelength dependence of retardation, was 1.05, showing that the coating layer had the function of an optical compensation layer.

Example 3

The N-n-octylmaleimide polymer resin obtained in Synthesis Example 3 was dissolved in chloroform to prepare a 16% solution. This solution was cast on a glass base by a coater and dried at room temperature for 24 hours to obtain a coating layer on the glass base. Thus, a coating layer film having a width of 50 mm and a thickness of 50 μm was produced. The Tg of the coating layer film was measured and, as a result, was found to be 145° C.

The coating layer obtained had a light transmittance of 92.78% and a haze of 0.9%, and the three-dimensional refractive indexes thereof were nx=1.51049, ny=1.51049, and nz=1.50833. The layer had an in-plane retardation of 0 nm and an Rth of 108 nm. The value of R450/R589 thereof, which indicates the wavelength dependence of retardation, was 1.05, showing that the coating layer had the function of an optical compensation layer.

Example 4

The N-n-octylmaleimide-maleic anhydride copolymer resin obtained in Synthesis Example 4 was dissolved in chloroform to prepare a 16% solution. This solution was cast on a glass base by a coater and dried at room temperature for 24 hours to obtain a coating layer on the glass base. Thus, a coating layer film having a width of 50 mm and a thickness of 50 μm was produced. The Tg of the coating layer film was measured and, as a result, was found to be 150° C.

The coating layer obtained had a light transmittance of 92.2% and a haze of 0.8%, and the three-dimensional refractive indexes thereof were nx=1.50680, ny1.50680, and nz=1.50422. The layer had an in-plane retardation of 0 nm and an Rth of 129 nm. The value of R450/R589 thereof, which indicates the wavelength dependence of retardation, was 1.05, showing that the coating layer had the function of an optical compensation layer.

Example 5

The N-n-octylmaleimide-maleic anhydride copolymer resin obtained in Synthesis Example 5 was dissolved in chloroform to prepare a 16% solution. This solution was cast on a glass base by a coater and dried at room temperature for 24 hours to obtain a coating layer on the glass base. Thus, a coating layer film having a width of 50 mm and a thickness of 50 μm was produced. The Tg of the coating layer film was measured and, as a result, was found to be 156° C.

The coating layer obtained had a light transmittance of 92.0% and a haze of 0.9%, and the three-dimensional refractive indexes thereof were nx=1.51593, ny=1.51594, and nz=1.51193, The layer had an in-plane retardation of 0.3 nm and an Rth of 200 nm. The value of R450/R589 thereof, which indicates the wavelength dependence of retardation, was 1.05, showing that the coating layer had the function of an optical compensation layer.

Example 6

The N-n-butylmaleimide polymer resin obtained in Synthesis Example 1 was dissolved in chloroform to prepare a 12% solution. This solution was cast on a film made of triacetyl cellulose (hereinafter referred to as TAC film) by a coater and dried at room temperature for 24 hours to obtain a coating layer on the TAC film. The coating layer was peeled from the TAC film. Thus, a coating layer film having a width of 50 mm and a thickness of 20 μm was produced. The glass transition temperature (Tg) of the coating layer was measured and, as a result, was found to be 179° C.

The coating layer obtained had a light transmittance of 91.5% and a haze of 0.6%, and the three-dimensional refractive indexes thereof were nx=1.51606, ny=1.51606, and nz=1.50954. The layer had an in-plane retardation of 0 nm and an Rth of 130.4 nm. The value of R450/R589 thereof, which indicates the wavelength dependence of retardation, was 1.06, showing that the coating layer had the function of an optical compensation layer. These properties were almost equal to the properties obtained in Example 1. The layered product was evaluated for the optical properties, without peeling the coating layer from the TAC film. As a result, the layered product was found to have a light transmittance of 90.2%, haze of 0.8%, in-plane retardation of 0 nm, and Rth of 156.8 nm. The value of R450/R589 thereof, which indicates the wavelength dependence of retardation, was 1.05, showing that the layered product had the function of an optical compensation film.

Example 7

The N-n-butylmaleimide polymer resin obtained in Synthesis Example 1 was dissolved in chloroform to prepare a 12% solution. This solution was cast on a glass base by a coater and dried at room temperature for 24 hours to obtain a coating layer on the glass base. Thus, a coating layer film having a width of 50 mm and a thickness of 20 μm was produced. The glass transition temperature (Tg) of the coating layer film was measured and, as a result, was found to be 179° C.

The coating layer obtained had a light transmittance of 91.6% and a hate of 0.0, and the three-dimensional refractive indexes thereof were nx1=1.51607, ny1=1.51607, and nz1=1.50954. The layer had an in-plane retardation of 0 nm and an Rth1 of 130.6 nm. The value of R450/R589 thereof, which indicates the wavelength dependence of retardation, was 1.06, showing that the coating layer had the function of an optical compensation layer.

The coating layer obtained was laminated to the stretched film obtained in Production Example 1 to produce a laminated film.

The laminated film obtained had a light transmittance of 90.2%, haze of 0.8%, in-plane retardation (Re2) of 121 nm, and orientation parameter (Nz) of 2.14, showing that the laminated film had the function of an optical compensation film.

Example 8

The N-n-octylmaleimide polymer resin obtained in Synthesis Example 3 was dissolved in chloroform to prepare a 16% solution. This solution was cast on a glass base by a coater and dried at room temperature for 24 hours to obtain a coating layer on the glass base. Thus, a coating layer film having a width of 50 mm and a thickness of 50 µm was produced. The Tg of the coating layer film was measured and, as a result, was found to be 145° C.

The coating layer obtained had a light transmittance of 92.78% and a haze of 0.9%, and the three-dimensional refractive indexes thereof were $nx1=1.51049$, $ny1=1.51049$, and $nz1=1.50833$. The layer had an in-plane retardation of 0 nm and an Rth1 of 108 nm. The value of R450/R589 thereof, which indicates the wavelength dependence of retardation, was 1.05, showing that the coating layer had the function of an optical compensation layer.

The coating layer obtained was laminated to the stretched film obtained in Production Example 1 to produce a laminated film.

The laminated film obtained had a light transmittance of 90.2%, haze of 0.8%, in-plane retardation (Re2) of 121 nm, and orientation parameter (Nz) of 1.36, showing that the laminated film had the function of an optical compensation film.

Example 9

The N-n-octylmaleimide-maleic anhydride copolymer resin obtained in Synthesis Example 6 was dissolved in chloroform to prepare a 16% solution. This solution was cast on a glass base by a coater and dried at room temperature for 24 hours to obtain a coating layer on the glass base. Thus, a coating layer film having a width of 50 mm and a thickness of 50 µm was produced. The Tg of the coating layer film was measured and, as a result, was found to be 156° C.

The coating layer obtained had a light transmittance of 92.0% and a haze of 0.7%, and the three-dimensional refractive indexes thereof were $nx1=1.51593$, $ny1=1.51593$, and $nz1=1.51193$. The layer had an in-plane retardation of 0.3 nm and an Rth1 of 200 nm. The value of R450/R589 thereof, which indicates the wavelength dependence of retardation, was 1.05, showing that the coating layer had the function of an optical compensation layer.

The coating layer obtained was laminated to the stretched film obtained in Production Example 1 to produce a laminated film.

The laminated film obtained had a light transmittance of 90.4%, haze of 0.9%, in-plane retardation (Re2) of 121 nm, and orientation parameter (Nz) of 2.53, showing that the laminated film had the function of an optical compensation film.

Example 10

The N-n-butylmaleimide polymer resin obtained in Synthesis Example 1 was dissolved in chloroform to prepare a 12% solution. This solution was cast on the stretched film obtained in Production Example 1, and dried at room temperature for 24 hours to obtain a laminated film comprising the stretched film of a cyclic polyolefin resin and the coating layer. The coating layer was peeled from part of the laminated film. Thus, a coating layer having a width of 50 mm and a thickness of 20 µm was produced. The glass transition temperature (Tg) of the coating layer was measured and, as a result, was found to be 179° C.

The coating layer obtained had a light transmittance of 91.5% and a haze of 0.6%, and the three-dimensional refractive indexes thereof were $nx1=1.51606$, $ny1=1.51606$, and $nz1=1.50954$. The layer had an in-plane retardation of 0 nm and an Rth1 of 130.4 nm. The value of R450/R589 thereof, which indicates the wavelength dependence of retardation, was 1.06, showing that the coating layer had the function of an optical compensation layer. These properties were almost equal to the properties obtained in Example 1. Furthermore, the laminated film obtained was evaluated as it was for the optical properties. As a result, the laminated film was found to have a light transmittance of 91.5%, haze of 0.6%, in-plane retardation (Re2) of 121 nm, and orientation parameter (Nz) of 2.14, showing that the laminated film had the function of an optical compensation film.

Example 11

The N-n-ethylmaleimide polymer resin obtained in Synthesis Example 7 was dissolved in chloroform to prepare a 12% solution. This solution was cast on a silicone-treated PET film by a coater and dried at 90° C. for 9.5 minutes to obtain a coating layer. Thus, a coating layer having a width of 100 mm and a thickness of 30 µm was produced. The glass transition temperature (Tg) of the coating layer was measured and, as a result, was found to be 255° C.

The coating layer obtained was peeled off and uniaxially stretched at 270° C. in a stretch ratio of 1.5. The layer obtained had a thickness of 30 µm, light transmittance of 92%, and haze of 0.6%, and the three-dimensional refractive indexes thereof were $nx4=1.5252$, $ny4=1.5232$, and $nz4=1.5168$. The layer had an in-plane retardation (Re1) of 60 nm and an out-of-plane retardation (Rth2) of 222 nm. The value of R450/R589 thereof, which indicates the wavelength dependence of retardation, was 1.07, showing that the layer had the function of an optical compensation layer.

Example 12

The N-n-butylmaleimide polymer resin obtained in Synthesis Example 1 was dissolved in chloroform to prepare a 12% solution. This solution was cast on a silicone-treated PET film by a coater and dried at 90° C. for 15 minutes to obtain a coating layer. Thus, a coating layer having a width of 50 mm and a thickness of 25 µm was produced. The glass transition temperature (Tg) of the coating layer was measured and, as a result, was found to be 179° C.

The coating layer obtained was peeled off and uniaxially stretched at 190° C. in a stretch ratio of 1.5. The layer obtained had a thickness of 20 µm, light transmittance of 91.6%, and haze of 0.5%, and the three-dimensional refractive indexes thereof were $nx4=1.5182$, $ny4=1.5145$, and $nz4=1.5078$. The layer had an in-plane retardation (Re1) of 74 nm and an out-of-plane retardation (Rth2) of 171 nm. The value of R450/R589 thereof, which indicates the wavelength dependence of retardation, was 1.06, showing that the layer had the function of an optical compensation layer.

Example 13

The N-n-octylmaleimide-maleic anhydride copolymer resin obtained in Synthesis Example 8 was dissolved in tetrahydrofuran to prepare a 15% solution. This solution was cast on a film of a cyclic polyolefin by a coater and dried at 90° C. for 10 minutes to obtain a coating layer having a thickness of 75 µm. This coating layer had a Tg of 150° C. The coating layer obtained was uniaxially stretched together with the cyclic-polyolefin substrate at 160° C. in a stretch ratio of 1.5. After the stretching, the coating layer was peeled from the substrate film and evaluated for the optical properties.

The layer obtained had a thickness of 20 µm, light transmittance of 92.2%, and haze of 0.5%, and the three-dimensional refractive indexes thereof were nx0%1.5079, ny4=1.5056, and nz4=1.5033. The layer had an in-plane retardation (Re1) of 115 nm and an Rth2 of 172.5 nm. The value of R450/R589 thereof, which indicates the wavelength dependence of retardation, was +1.04, showing that the layer had the function of an optical compensation layer.

Comparative Example 1

Into a 1-liter autoclave were introduced 400 mL of toluene as a polymerization solvent, 0.001 mol of perbutyl neodecanoate as a polymerization initiator, 0.42 mol of N-(2,6-diethylphenyl)maleimide, and 4.05 mol, of isobutene. A polymerization reaction was conducted at a polymerization temperature of 60° C. for a polymerization time of 5 hours to obtain an N-(2,6-diethylphenyl)maleimide-isobutene alternating copolymer. The N-(2,6-diethylphenyl)maleimide-isobutene alternating copolymer obtained had a number-average molecular weight of 65,000.

A solution consisting of 20% by weight of the N-(2,6-diethylphenyl)maleimide-isobutene alternating copolymer obtained and 80% by weight of methylene chloride was prepared. This solution was cast on a PET film, and the methylene chloride was volatilized from the solution. The resultant solidified film of the N-(2,6-diethylphenyl)maleimide-isobutene alternating copolymer was peeled off. The film peeled off was dried at 100° C. for 4 hours and subsequently dried at the temperatures ranging from 120° C. to 160° C. at 10° C. intervals, for 1 hour with respect to each temperature, and was thereafter dried in a vacuum dryer at 180° C. for 4 hours to obtain a film having a thickness of about 100 μm. (The three-dimensional refractive indexes of the film obtained were nx==1.5400, ny=1.5400, and nz=4.5400.)

A small piece of 5 cm×5 cm was cut out of the film and subjected to free-width uniaxial stretching with a biaxially stretching apparatus (manufactured by Shibayama Scientific Co. Ltd.) under the conditions of a temperature of 220° C. and a stretching speed of 15 mm/min. The film was thus stretched by +50% to thereby obtain a stretched film. The three-dimensional refractive indexes of the stretched film obtained were nx4=1.53913, ny4=1.54042, and nz4=1.54045.

While the invention has been described in detail and with reference to specific embodiments thereof, it will be apparent to one skilled in the art that various changes and modifications can be made therein without departing from the spirit and scope thereof.

The invention is based on a Japanese patent application filed on Apr. 18, 2007 (Application No. 2007-109052), a Japanese patent application filed on Apr. 18, 2007 (Application No. 2007-109053), and a Japanese patent application filed on Dec. 25, 2007 (Application No. 2007-331825), the contents thereof being herein incorporated by reference.

INDUSTRIAL APPLICABILITY

According to the invention, optical compensation layers and optical compensation films which have excellent optical properties can be provided. More particularly, optical compensation layers and optical compensation films can be provided which have an optically compensating function imparted thereto upon coating fluid application or upon coating fluid application and subsequent uniaxial stretching and which have a small wavelength dependence of retardation.

The invention claimed is:

1. An optical compensation layer wherein the compensation layer is a coating layer comprising an unstretched film consisting of at least one N-substituted maleimide polymer resin, wherein the at least one N-substituted maleimide polymer resin consists of one or more residue units selected from the group consisting of an N-n-butylmaleimide residue unit, an N-isobutylmaleimide residue unit, an N-s-butylmaleimide residue unit, an N-t-butylmaleimide residue unit, an N-hexylmaleimide residue unit, and an N-octylmaleimide residue unit, and
   wherein when two arbitrary axes perpendicular to each other in the plane of the coating layer are referred to as x-axis and y-axis, respectively, and the out-of-plane direction is referred to as z-axis, then the coating layer satisfies the three-dimensional refractive-index relationship $nx \approx ny > nz$,
   wherein nx is the refractive index in the x-axis direction, ny is the refractive index in the y-axis direction, and nz is the refractive index in the z-axis direction.

2. The optical compensation layer according to claim 1, wherein the layer has an out-of-plane retardation (Rth) in the range of 30-2,000 nm, wherein the out-of-plane retardation is represented by the following expression (2) when examined with a light having a measuring wavelength of 589 nm:

$$Rth = ((nx+ny)/2 - nz)*d \quad (2)$$

wherein d represents the thickness (nm) of the optical compensation layer.

3. The optical compensation layer according to claim 1, which has a wavelength dependence of retardation (R450/R589) of 1.1 or lower, wherein the wavelength dependence of retardation is represented by the ratio of the retardation (R450) of the coating layer inclined at 40 degrees and examined with a light having a measuring wavelength of 450 nm to the retardation (R589) of the coating layer inclined at 40 degrees and examined with a light having a measuring wavelength of 589 nm.

4. The optical compensation layer according to claim 1, which is an optical compensation layer for liquid-crystal display elements.

5. An optical compensation film which is a layered product comprising the optical compensation layer according to claim 1 and a film made of a cellulosic resin.

6. The optical compensation film according to claim 5, which is an optical compensation film for liquid-crystal elements.

7. A process for producing the optical compensation layer according to claim 1, which comprises applying a solution comprising the at least one N-substituted maleimide polymer resin to a substrate and drying the solution applied.

8. An optical compensation film which comprises:
   a coating layer (A) comprising an unstretched film consisting of at least one N-substituted maleimide polymer resin, wherein the at least one N-substituted maleimide polymer resin consists of one or more residue units selected from the group consisting of an N-n-butylmaleimide residue unit, an N-isobutylmaleimide residue unit, an N-s-butylmaleimide residue unit, an N-t-butylmaleimide residue unit, an N-hexylmaleimide residue unit, and an N-octylmaleimide residue unit, and
   a stretched-film layer (B).

9. The optical compensation film according to claim 8, wherein the layer (A) comprises a coating layer wherein when two arbitrary axes perpendicular to each other in the plane of the coating layer are referred to as x1-axis and y1-axis, respectively, and the out-of-plane direction is referred to as z1-axis, then the coating layer satisfies the three-dimensional refractive-index relationship $nx1 \approx ny1 > nz1$, wherein nx1 is the refractive index in the x1-axis direction, ny1 is the refractive index in the y1-axis direction, and nz1 is the refractive index in the z1-axis direction.

10. The optical compensation film according to claim 8, wherein the layer (A) comprises a coating layer which has an out-of-plane retardation (Rth1) in the range of 30-2,000 nm, wherein the out-of-plane retardation is represented by the following expression (3) when examined with a light having a measuring wavelength of 589 nm:

$$Rth1=((nx1+ny1)/2-nz1)*d1 \qquad (3)$$

wherein d1 represents the thickness (nm) of the coating layer (A).

11. The optical compensation film according to claim 8, wherein the layer (A) comprises a coating layer having a wavelength dependence of retardation (R450/R589) of 1.1 or lower, wherein the wavelength dependence of retardation is represented by the ratio of the retardation (R450) of the coating layer inclined at 40 degrees and examined with a light having a measuring wavelength of 450 nm to the retardation (R589) of the coating layer inclined at 40 degrees and examined with a light having a measuring wavelength of 589 nm.

12. The optical compensation film according to claim 8, wherein the layer (B) comprises a stretched-film layer wherein when the direction of stretching in the plane of the stretched film is referred to as x2-axis, the in-plane direction perpendicular to the direction of stretching is referred to as y2-axis, and the out-of-plane (thickness) direction for the film is referred to as z2-axis, then the film satisfies the three-dimensional refractive-index relationship nx2>ny2>nz2, wherein nx2 is the refractive index in the x2-axis direction, ny2 is the refractive index in the y2-axis direction, nz2 is the refractive index in the z2-axis direction, wherein the stretched-film layer (B) having an in-plane retardation (Re) of 20 nm or more, wherein the in-plane retardation is represented by the following expression (4) when examined with a light having a measuring wavelength of 589 nm:

$$Re=(nx2-ny2)*d2 \qquad (4)$$

wherein d2 represents the thickness (nm) of the stretched-film layer (B).

13. The optical compensation film according to claim 8, wherein the layer (B) comprises a stretched-film layer comprising at least one resin selected from the group consisting of a polycarbonate resin, a polyethersulfone resin, a cyclic polyolefin resin, and a cellulosic resin.

14. The optical compensation film according to claim 8, wherein when the direction of the in-plane slow axis in the optical compensation film is referred to as x3-axis, the in-plane direction perpendicular to the x3-axis is referred to as y3-axis, and the out-of-plane (thickness) direction for the film is referred to as z3-axis and the film has an orientation parameter (Nz) when examined with a light having a measuring wavelength of 589 nm of 1.1 or larger, wherein the orientation parameter is represented by the following expression (5), wherein nx3 is the average refractive index in the x3-axis direction, ny3 is the average refractive index in the y3-axis direction, and nz3 is the average refractive index in the z3-axis direction:

$$Nz=(nx3-nz3)/(nx3-ny3). \qquad (5)$$

15. The optical compensation film according to claim 8, which is an optical compensation film for liquid-crystal display elements.

16. A process for producing the optical compensation film according to claim 8, which comprises applying a solution comprising the at least one N-substituted maleimide polymer resin to a stretched-film layer (B) and drying the solution applied to be a coating layer (A).

* * * * *